US010882443B2

United States Patent
Prill

(10) Patent No.: US 10,882,443 B2
(45) Date of Patent: Jan. 5, 2021

(54) STEERING CONTROL DEVICE WITH AN INDICATOR LIGHT SYSTEM FOR A MOTOR VEHICLE AND METHOD FOR OPERATING AN INDICATOR LIGHTING SYSTEM OF A STEERING CONTROL DEVICE

(71) Applicants: HYUNDAI MOTOR COMPANY, Seoul (KR); KIA MOTORS CORPORATION, Seoul (KR)

(72) Inventor: Andy Prill, Heusenstamm (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/515,872

(22) Filed: Jul. 18, 2019

(65) Prior Publication Data

US 2020/0262340 A1    Aug. 20, 2020

(30) Foreign Application Priority Data

Feb. 15, 2019    (DE) .......... 10 2019 202 020

(51) Int. Cl.
*B60Q 3/283*     (2017.01)
*B62D 1/04*      (2006.01)
*H05B 45/20*     (2020.01)

(52) U.S. Cl.
CPC ............ *B60Q 3/283* (2017.02); *B62D 1/046* (2013.01); *H05B 45/20* (2020.01); *B60Q 2500/00* (2013.01)

(58) Field of Classification Search
CPC .... B60Q 3/283; B60Q 2500/00; B62D 1/046; H05B 45/20
USPC ........................................... 340/468
See application file for complete search history.

(56) References Cited

U.S. PATENT DOCUMENTS

| | | | | |
|---|---|---|---|---|
| 4,835,512 A | * | 5/1989 | Bratton ................. | B60Q 3/14 340/457.2 |
| D462,039 S | * | 8/2002 | Larocque ............... | D12/176 |
| 10,545,498 B2 | * | 1/2020 | Christiansen ........... | B60Q 9/00 |
| 2006/0070795 A1 | * | 4/2006 | Meissner ............. | G01C 21/3652 180/446 |
| 2009/0063053 A1 | * | 3/2009 | Basson ................ | B60Q 9/008 702/1 |
| 2011/0115617 A1 | * | 5/2011 | Bennett .............. | B60Q 9/00 340/439 |
| 2011/0121961 A1 | * | 5/2011 | Bennett .............. | B62D 1/046 340/439 |

(Continued)

FOREIGN PATENT DOCUMENTS

DE    102006024194 A1    12/2006
DE    102011106874 A1    3/2012
(Continued)

*Primary Examiner* — Ojiako K Nwugo
(74) *Attorney, Agent, or Firm* — McDonnell Boehnen Hulbert & Berghoff LLP

(57) ABSTRACT

A steering control device with an indicator light system for a motor vehicle comprises a plurality of light emitting elements distributed over an indication surface of the steering control device and a control unit configured to collectively control the light emitting elements to display an illumination pattern depending on at least one of a driving situation and a system condition.

13 Claims, 2 Drawing Sheets

(56) References Cited

U.S. PATENT DOCUMENTS

| | | | |
|---|---|---|---|
| 2011/0187518 A1* | 8/2011 | Strumolo | B62D 15/029 340/438 |
| 2011/0257846 A1* | 10/2011 | Bennett | B60Q 1/50 701/45 |
| 2014/0109719 A1* | 4/2014 | Lisseman | B60Q 9/00 74/552 |
| 2014/0111324 A1* | 4/2014 | Lisseman | B60K 35/00 340/435 |
| 2014/0111325 A1* | 4/2014 | Lisseman | B60Q 3/283 340/435 |
| 2014/0139341 A1* | 5/2014 | Green | A61B 5/6893 340/576 |
| 2014/0159887 A1* | 6/2014 | Piasecki | B60Q 1/00 340/438 |
| 2015/0217776 A1* | 8/2015 | Berezhnyy | G01P 13/00 356/614 |
| 2016/0184722 A1* | 6/2016 | Kathavate | A63H 30/04 446/465 |
| 2016/0311366 A1* | 10/2016 | Lisseman | G02B 6/0093 |
| 2017/0106786 A1* | 4/2017 | Ebina | B60Q 3/283 |
| 2017/0166116 A1* | 6/2017 | Asakawa | B60K 35/00 |
| 2017/0166117 A1* | 6/2017 | Nagata | B60Q 3/14 |
| 2018/0015826 A1* | 1/2018 | Ahmad | B60Q 9/00 |
| 2018/0178808 A1* | 6/2018 | Zhao | G08B 21/06 |
| 2019/0008050 A1* | 1/2019 | Ali | H05K 1/167 |
| 2019/0025823 A1* | 1/2019 | Christiansen | B60K 37/00 |
| 2019/0276050 A1* | 9/2019 | Mega | B62D 1/046 |
| 2020/0039558 A1* | 2/2020 | Aerts | G06F 3/017 |

FOREIGN PATENT DOCUMENTS

| | | |
|---|---|---|
| JP | 2001-057123 A | 2/2001 |
| JP | 2006-521954 A | 9/2006 |
| JP | 2016-032257 A | 3/2016 |
| KR | 10-2013-0021984 A | 3/2013 |

* cited by examiner

STEERING CONTROL DEVICE WITH AN INDICATOR LIGHT SYSTEM FOR A MOTOR VEHICLE AND METHOD FOR OPERATING AN INDICATOR LIGHTING SYSTEM OF A STEERING CONTROL DEVICE

CROSS-REFERENCE TO RELATED APPLICATIONS

This application claims the benefit of priority to German Patent Application No. 102019202020.8, filed on Feb. 15, 2019, the entire contents of which are incorporated herein by reference.

TECHNICAL FIELD

The present disclosure pertains to a steering control device with an, in particular peripheral, indicator light system for a motor vehicle and a method for operating an indicator lighting system of a steering control device.

BACKGROUND

Current motor vehicles comprise a multitude of indicating lights, e.g. warning and/or malfunction lights, turn indicators, speedometer, fuel gauge, lighting controls etc. Furthermore, with the rise of assisted and autonomous driving additional displayed indications became relevant, e.g. vehicle status and/or driver take over and similar. Historically most or all of such indicating lights as well as other instrumentation and controls were integrated somewhere in the dashboard of a vehicle. However, there is a recent trend to move functionalities to the steering wheel, that is the steering control device of the vehicle, e.g. to improve and ease accessibility and thus increase safety. One underlying rationale is that the steering wheel symbolizes the driving task more than any other interface within the vehicle, which makes the steering wheel the ideal tool to provide any relevant maneuver information.

In autonomous driving applications it is particularly relevant that the driver can swiftly and easily access any relevant information on the vehicle status, for example to be able to decide if a manual take-over is required. Generally, indicating lights should be placed so as to distract the driver as little as possible while at the same time delivering any relevant information in a clear and distinct way. In particular, indicating lights should not blind the driver.

Document DE 10 2006 024 194 A1 describes a vehicle lighting system, in which an inner or outer light source is connected to a steering wheel of a vehicle.

SUMMARY

Hence, there is a need to find solutions for displaying status and/or driving indicators in a vehicle, which distract the driver as little as possible.

According to an aspect of the disclosure, a steering control device with an indicator light system for a motor vehicle comprises a plurality of light emitting elements distributed over an indication surface of the steering control device; and a control unit configured to collectively control the light emitting elements to display an illumination pattern depending on at least one of a driving situation and a system condition.

According to another aspect of the disclosure, a motor vehicle comprises a steering control device.

According to yet another aspect of the disclosure, a method for operating an indicator lighting system of a steering control device comprises collectively controlling, by the control device, the light emitting elements to display an illumination pattern depending on at least one of a driving situation and a system condition.

One idea of the present disclosure is to distribute a multitude of individual light emitting elements, e.g. standalone LEDs, over a segment of a steering control element, which then form an active, that is light emitting, indication surface. The light emitting elements are controlled together to form certain illumination patterns, which may provide the driver with certain indicators and/or information about a status of the system and/or the vehicle as well as about a current driving situation. The light emitting elements may particularly be arranged to achieve the effect of a partially and/or sectionally luminous steering control element. For example, the light emitting elements may be arranged within a peripheral section of the steering control element, e.g. a steering wheel, which becomes illuminated through the light emitting elements and thus perceivable by the driver without having to focus actively on any display, icon or other instrumentation. In one particular example, a ring of LEDs may be arranged along a circumference of a steering wheel. The ring of LEDs may be configured to emit red light in case of an urgent takeover maneuver, for example, and to emit yellow light in case of a less urgent soft takeover. Due to the peripheral arrangement of the light emitting elements as well as the subdued yet perceivable light pattern of individual elements, the driver will thus be able to notice if a takeover is imminent without having to read instrumentation or focus on a display or similar, and hence may continue to concentrate on the road ahead.

In the specific example of an autonomous driving system, certain illumination patterns may indicate certain imminent maneuvers, e.g. a turn, a passing maneuver and so on. Different maneuvers may be represented by different illumination patterns of the light emitting elements. To this end, various functional aspects of the light emitting elements may be employed that affect the visual perception of a driver. For example, color and/or brightness of the light emitting elements may be varied. Or as another example, the light emitting elements may be operated in special modes including blinking and/or dimming. Furthermore, the light emitting elements may be switched on or off according to some pattern. Beyond that even complex operating modes of the plurality of light emitting elements may be contemplated, in which the light output of the light emitting elements is changed to form animation patterns and so on. In one example, a moving light may be generated by switching on and off individual LEDs one after the other along a band or array. In another example, a moving or changing shape may be generated by switching on and off a number of LEDs within a two-dimensional pattern.

As a consequence, status and/or driving indicators may be visualized in a vehicle with minimal distraction of the driver as well as decreased reaction time.

Advantageous embodiments and improvements of the present disclosure are found in the subordinate claims.

According to an embodiment of the disclosure, the control unit may be configured to control an intensity of the illumination pattern based on position data comprising driver position data and/or steering control device position data. Accordingly, the method may comprise acquiring position data, by a sensor device, comprising driver position data and/or steering control device position data. The method may further comprise controlling, by the control device, an intensity of the illumination pattern based on the acquired position data.

In particular, the relative position of the driver and each light emitting element on the steering control device may be considered in order to adjust the light output of the system to avoid any blinding of the driver. Based on such or other position data an intensity of the light emitting elements may be adjusted and/or individual or several light emitting elements may be de-/activated to optimize the light output of the light emitting elements and thus the intensity of the illumination pattern. The steering control device position data may comprise, for example, a relative position of the steering control device within the vehicle. To this end, sensor devices may be provided that track any adjustment of length, height and/or (tilt) angle of the steering control device, e.g. a steering wheel. Driver position data may comprise information about a current position of the driver, e.g. positions of the driver's eyes. However, in certain embodiments, it may be sufficient to merely determine a current seat position of the driver seat, which may then be considered as part of the driver position data to estimate the driver's position and/or that of the driver's eyes based on expected values and/or standard values, e.g. taken from ergonomic anthropometry models.

According to an embodiment of the disclosure, the driver position data may include an estimated driver eye position and/or a measured driver eye position.

For example, a sensor device may be provided, which may comprise a camera system or the like to monitor the current position and/or state of the driver or certain body parts of the driver, in particular the head and/or the eyes. Additionally or alternatively, the sensor device may be configured to determine the current seat position of the driver seat. The control unit of the system may be configured to estimate a position of the driver's head and/or eyes based on the determined seat position, e.g. using ergonomic anthropometry models.

According to an embodiment of the disclosure, the control unit may be configured to selectively adjust brightness and/or color of the light emitting elements. The control unit may further be configured to selectively activate the light emitting elements. Accordingly, the method may comprise selectively adjusting brightness and/or color of the light emitting elements and/or selectively activating the light emitting elements.

For example, a light intensity of each light emitting element may be calculated with respect to a calculated and/or estimated driver's eye position. Next, the brightness of the light emitting elements may be adjusted accordingly in order to optimize the visual appearance of the illumination pattern for the current position of the driver's eyes. Hence, it can be made sure at any time that the driver is not blinded and or distracted by the light output of the system. Alternatively or additionally, the color of individual light emitting elements may be changed. Furthermore, intensity as well as color of the illumination pattern may also be affected by switching on or off individual light emitting elements of a certain brightness and/or color.

In other examples, the light emitting elements may be subdivided into groups, whose light output is then controlled collectively. This can be used to simplify the control calculations in case of large numbers of individual light emitting elements. For example, only an average distance of the group of elements with respect to the driver may be considered.

According to an embodiment of the disclosure, the control unit may be configured to adapt the illumination pattern based on a current orientation and/or a current position of the steering control device. The control unit may be particularly configured to adapt the illumination pattern based on a steering angle of the steering control device. Accordingly, the method may comprise adapting, by the control device, the illumination pattern based on at least one of a current orientation and a current position of the steering control device.

According to an embodiment of the disclosure, the control unit may be configured to adapt the illumination pattern depending on a movement of the steering control device relative to an interior of the motor vehicle such that the illumination pattern is stationary relative to the interior.

For example, an LED light pattern and illumination may be adapted to the current steering angle of a steering wheel (e.g. an absolute position). The LEDs may be arranged as a peripheral circle around a circumference of the steering wheel, e.g. the LEDs may be embedded into a surface of a steering ring of the steering wheel. The illumination pattern may be a "left turn" pattern, wherein only the LEDs on a left side of the steering wheel (as seen from the driver) may emit light. The control unit may now control the LEDs such that this left turn pattern remains at the same absolute position during any possible rotation of the steering wheel (e.g. a left rotation). This means that the LEDs have to be turned off and on along the circumference of the steering ring in accordance with the current steering angle in order to keep the illumination pattern at the same absolute position of the steering wheel.

According to an embodiment of the disclosure, the light emitting elements may be arranged on the indication surface as an array, a band and/or a planar shape.

For example, several parallel arrays of LEDs may form a band, e.g. around a steering wheel. In other embodiments, LEDs may be arranged in different shapes across a surface of a steering wheel, e.g. some LEDs may be arranged as a ring around the steering wheel while others may be arranged as beams or bars on the spokes of the steering wheel. The spokes may connect the steering ring to a central hub of the steering wheel, which in turn may be mounted to a steering column. However, the person of skill will contemplate many other convenient arrangements of light emitting elements depending on the specific application.

According to an embodiment of the disclosure, the indication surface may be positioned peripherally on a front side of the steering control device.

Peripheral arrangements of the light emitting elements may be particularly advantageous for minimizing potential distracting effects that any light emitted by the system might have on the driver.

According to an embodiment of the disclosure, the steering control device may be a steering wheel.

According to an embodiment of the disclosure, the plurality of light emitting elements may be arranged as a ring around a circumference of the steering wheel.

For example, the light emitting elements may be arranged as a peripheral ring or several such rings on an outer steering ring of a steering wheel.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Figure 1:
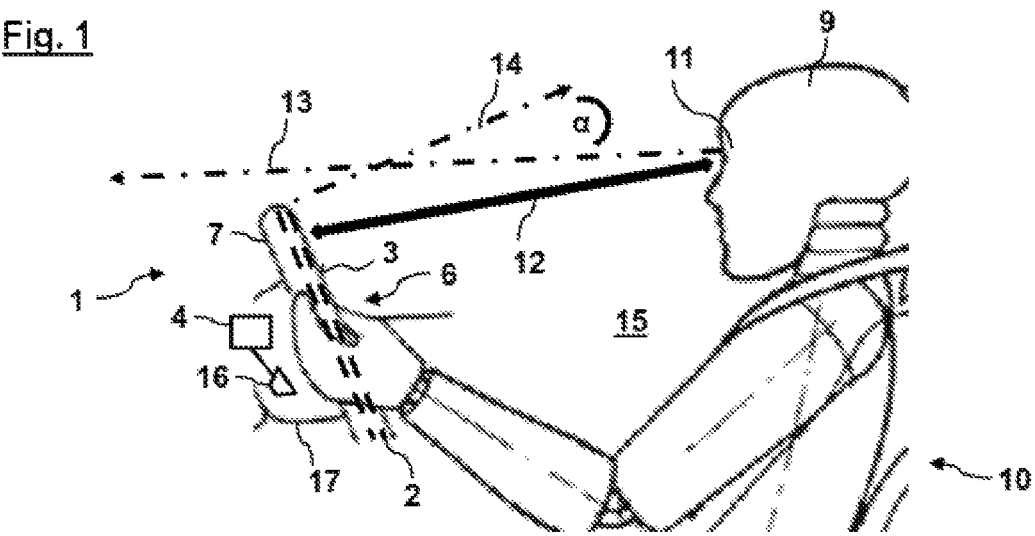
FIG. 1 is a schematic side view of a steering control device with a peripheral indicator light system for a motor vehicle according to an embodiment of the disclosure.
Figure 7:
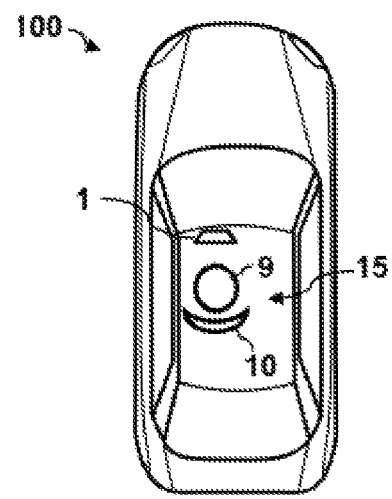
FIG. 7 schematically shows a motor vehicle comprising one of the steering control devices of FIGS. 1-5.

FIG. 1 schematically depicts a side view of a steering control device 1 with a peripheral indicator light system for a motor vehicle 100 according to an embodiment of the disclosure. The motor vehicle 100 may in particular be an automobile as it is exemplarily shown in FIG. 7. The vehicle 100 may be connected with various sensors and telematics in order to implement advanced driver-assistance systems ADAS and/or autonomous driving functionalities (not shown in FIG. 7). The vehicle 100 may particularly comprise a sensor system with a variety of different sensors as they are utilized in modern motor vehicles in assisted and/or autonomous driving systems. The vehicle 100 thus may feature different assisted and/or autonomous driving modes or driving conditions, in which some or all of the driving functionalities of the vehicle 100 are controlled by the respective autonomous driving system.

The steering control device 1 of this exemplary embodiment is a steering wheel, which comprises a plurality of LEDs, e.g. RGB LEDs, as light emitting elements 2 at a front side 6 of the steering control device 1. The light emitting elements 2 are configured to emit light into an interior 15 of the vehicle 100, which can be perceived by a driver 9 sitting on a driver seat 10 in front of the steering control device 1. The light emitting elements 2 are distributed over an indication surface 3 of the steering control device 1, which is arranged peripherally around a circumference of an outer steering ring 7 of the steering control device 1. The light emitting elements 2 are particularly arranged in this embodiment as a ring consisting of two adjacent LED arrays. The steering ring 7 is mounted to a steering column 17 in the usual way, e.g. via a central hub or the like.

Figure 2:
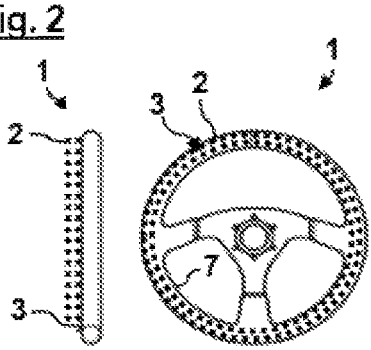
FIG. 2 schematically shows the steering control device of FIG. 1 in side and front view.

FIG. 2 shows an example of such a steering control device 1, in which two adjacent arrays of LEDs form a ring around the periphery of a steering control device 1. FIG. 2 shows a schematic side view of the steering control device 1 on the left and a front view of the steering control device 1 on the right.

Figure 3:
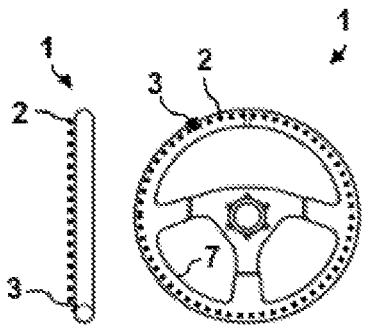
FIG. 3 schematically shows a steering control device according to another embodiment of the disclosure in side and front view.

FIG. 3 depicts an alternative embodiment, in which only one array of LEDs as light emitting elements 2 is formed on the periphery of the steering control device 1. In a similar vein, the person of skill will contemplate various other embodiments with different arrangements of light emitting elements 2.

Figure 4:
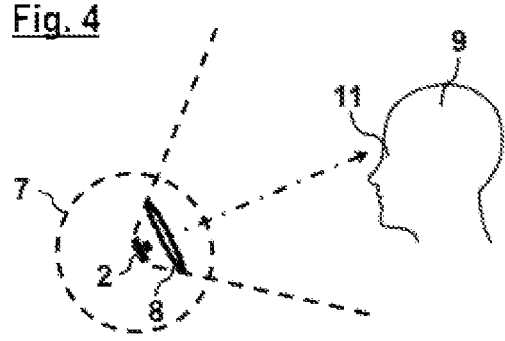
FIG. 4 is a schematic cross-sectional view of a steering ring of the steering control device of FIG. 3.
Figure 5:
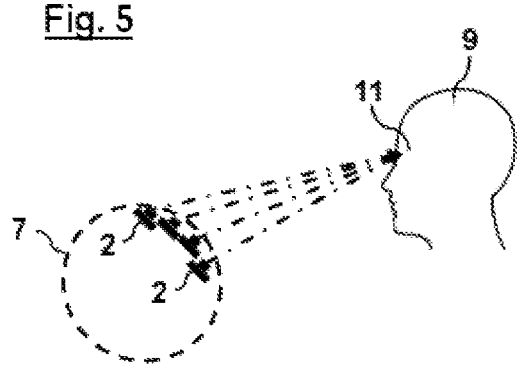
FIG. 5 is a schematic cross-sectional view of a steering ring of a steering control device according to yet another embodiment of the disclosure.

Referring now to FIG. 4, each light emitting element 2 being arranged on the steering ring 7 may emit light, which is perceived by the driver 9. To this end, the light may first pass a diffusion lens 8 and other optical devices as they are known in the art. After passing the diffusion lens 8, the light from the exemplary light emitting element 2 of FIG. 4 finally reaches an eye 11 of the driver 9. To provide an example for the more general case of a multitude of light emitting elements 2, FIG. 5 shows four LEDs emitting light, which is perceived by the driver 9 as coming from slightly shifted points on the steering ring 7, each of which having a slightly different distance to the driver 9.

Referring again to FIG. 1, the steering control device 1 further comprises a control unit 4, which is configured to collectively control the light emitting elements 2 to display an illumination pattern 5 to the driver 11. The illumination pattern 5 may be varied depending on a driving situation and/or a system/vehicle condition. To this end, the control unit 4 may be communicatively connected to an assisted/autonomous driving unit of the vehicle 100 (not depicted) and/or to other controls and/or sensors of the vehicle 100 providing information on the driving situation and/or the system/vehicle status.

Figure 8:
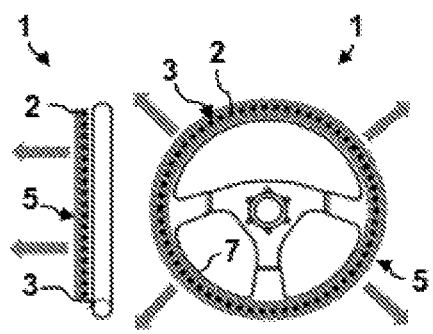
FIG. 8 schematically shows the steering control device of FIG. 3 with an exemplary illumination pattern.

FIG. 8 depicts one example for an illumination pattern 5 on the basis of the steering control device 1 of FIG. 3. In this example, all light emitting elements 2 are collectively turned on and emit light of a specific color and brightness (the emitted light is indicated by hatching and arrows). For example, the light emitting elements 2 may glow in soft white to indicate that an assisted/autonomous driving system is available. The light emitting elements 2 may switch to blue as soon as the assisted/autonomous driving system is switched on by the driver 9 and continue to glow blue until the assisted/autonomous driving system is switched off again. In order to better raise the awareness of the driver 9, the control unit 4 may be further configured to display a special illumination pattern for a short time interval after the assisted/autonomous driving system is turned on and/or off. For example, the LEDs of the steering control device 1 may perform a circle animation, that is the LEDs are switched on/off so as to provide the visual appearance of a light moving around the steering ring 7, e.g. in white color. After that short interval, the light emitting elements 2 may glow in blue for as long as the assisted/autonomous driving system stays on. When the assisted/autonomous driving system is switched off, the light emitting elements 2 may return to glow in white, possibly after displaying another circle animation.

In another example, the illumination pattern 5 may involve the light emitting elements 2 to glow in a soft yellow color, which may indicate that the assisted/autonomous driving system is about to initiate a passing maneuver of the vehicle 100. For example, the illumination pattern 5 may comprise operating the light emitting elements 2 in a blinking or flashing modus, in which they are turned on and off quickly for a short time interval, e.g. for 10 seconds before the passing maneuver is performed. The illumination pattern 5 may change to red when the passing maneuver is imminent.

As it is illustrated in FIG. 8, the light emitting elements 2 are arranged on the periphery of the steering control device 1. For example, the light emitting elements 2 may be embedded into a surface or rim of the steering ring 7. The driver 9 is thus able to perceive a change in the illumination pattern 5 without having to focus or concentrate on a display or other instrumentation. Due to the peripheral arrangement of the light emitting elements 2, the driver 9 is able to keep focusing on the road ahead or on other tasks. By using suitable lighting and color schemes, the person of skill will be able to implement various illumination patterns for different applications that pose no relevant distraction for the driver.

Figure 9:
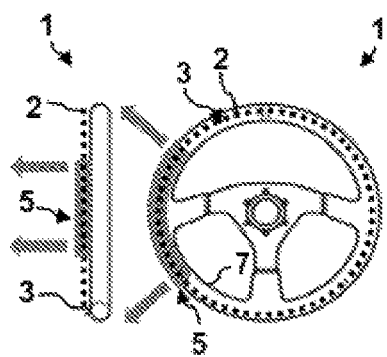
FIG. 9 schematically shows the steering control device of FIG. 3 with another exemplary illumination pattern.
Figure 10:
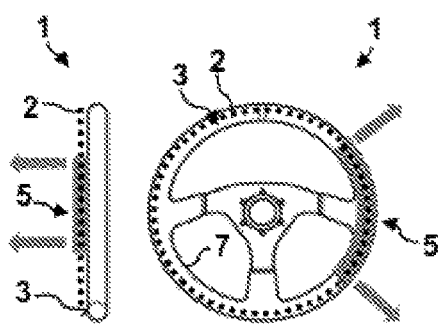
FIG. 10 schematically shows the steering control device of FIG. 3 with yet another exemplary illumination pattern.

Another example for the steering control device 1 of FIG. 2 is depicted in FIGS. 9 and 10. FIGS. 9 and 10 are examples for a lane change maneuver such as passing/overtaking, turning and so on. The illumination pattern 5 may comprise a certain subgroup of the light emitting elements 2 either on the left or on the right of the steering wheel to glow in a specific color, e.g. green, for example when the assisted/autonomous driving system has initiated a corresponding lane change to the left or right. The light emitting elements 2 may be operated in a pulsed/blinking/flashing mode directly after initiation of the maneuver as long as the vehicle 100 waits for a suitable spot for performing the maneuver and then may change to a different color, e.g. orange, as soon as the vehicle 100 is actually performing the lane change. Moreover, a third color may be reserved for the case that the lane change maneuver has to be aborted for some reason, e.g. red.

The control unit 4 may be configured to adapt the illumination pattern 5 based on a current orientation and/or a current position of the steering control device 1, in particular on a steering angle. To this end, the control unit 4 may be coupled with a sensor device 16 (shown in FIG. 1), which determines the orientation and/or position of the steering control device 1. The illumination pattern 5 may particularly be adapted depending on a movement of the steering control device 1 relative to the interior 15 of the motor vehicle 100, e.g. relative to the seats, the vehicle body and so on, such that the illumination pattern 5 is stationary relative to the interior 15. In the example of FIGS. 9 and 10, the driver 9 and/or the assisted/autonomous driving system may turn the steering wheel. To prevent turning of the illumination pattern 5 with the movement of the steering wheel, the light emitting elements 2 may be controlled such as to keep the illumination pattern 5 in the position shown on FIGS. 9 and 10 independent of the current steering angle of the steering control device 1.

Again referring to FIG. 1, in order to avoid any blinding of the driver 9 by the LEDs, the control unit 4 is further configured to control an intensity of the illumination pattern 5 based on position data comprising driver position data and/or steering control device position data. For example, the sensor device 16 may be configured to determine the current seat position of the driver seat 10. The control unit 4 may utilize this information to provide an estimate for the driver's eye position 11, e.g. based on ergonomic anthropometry models or the like. Alternatively or additionally, the sensor device 16 may be configured to measure the driver eye position 11, e.g. by employing a camera system and/or a similar sensor system usually used for this purpose. The control unit 4 may further utilize information on the current position (height, length, angle etc.) of the steering wheel. On this basis, the control unit 4 may then be configured, for example, to adjust the brightness and/or color of the light emitting elements 2 and/or to selectively de-/activate the light emitting elements 2.

Hence, the system comprises a light adjustment management function that provides an optimal illumination independent of a possible movement of the driver 9 within the vehicle 100. The control unit 4 may calculate a distance 12 from the light emitting elements 2 to the driver 9, that is to the driver eye position 11, on basis of the position data (FIG. 1). Further, based on the driver eye position 11 (estimated or measured) and the knowledge of the position of the light emitting elements 2, a center angle 14 of the light emitting elements 2 and a line of sight 13 of the driver 9 to the front of the vehicle 100 are determined. On this basis, an angle of light intensity a can be calculated, i.e. the intersection angle between the front line of sight 13 and the center angle 14, on which basis the intensity of the light emitting elements 2 may be adjusted in accordance with the distance 13 taking into account further parameters like available daylight and similar (e.g. using a light sensor installed in the vehicle 100). Hence, an optimal light intensity may be calculated for each light emitting element 2 individually. Alternatively or additionally, an average light intensity may be calculated for groups of such elements. This can be used to choose the current illumination pattern 5 and its intensity for optimal visibility.

In sum, an indicator light system is provided that does not blind the driver. This may be particularly relevant in case of assisted/autonomous driving systems, where the present indicator light system may serve to inform the driver of any upcoming or current maneuvers of the vehicle as well as the status of the system/vehicle. It is to be understood that the visual guidance of the illumination pattern may be accompanied by other visual and/or acoustical signals and/or warnings to further increase the perception by the driver.

Figure 6:
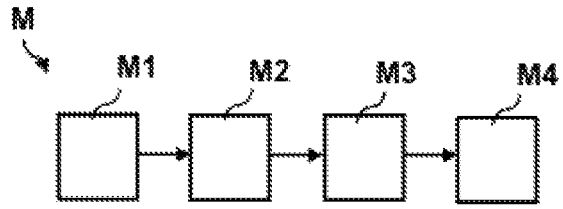
FIG. 6 shows a schematic flow diagram of a method for operating a peripheral indicator lighting system of one of the steering control devices of FIGS. 1-5.

FIG. 6 shows a schematic flow diagram of a method M for operating a peripheral indicator lighting system of one of the steering control devices 1 of FIGS. 1-5. The method M comprises under M1 collectively controlling, by the control device 4, the light emitting elements 2 to display an illumination pattern 5 depending on at least one of a driving situation and a system condition. The method M further comprises under M2 acquiring position data, by the sensor device 16, comprising a least one of driver position data and steering control device position data. The method M further comprises under M3 controlling, by the control device 4, an intensity of the illumination pattern 5 based on the acquired position data. The steps M1 and M3 may further comprise selectively adjusting brightness and/or color of the light emitting elements 2 as well as selectively activating the light emitting elements 2. The method M may further comprise under M4 adapting, by the control device 4, the illumination pattern 5 based on at least one of a current orientation and a current position of the steering control device 1.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to explain the principles of the disclosure and its practical applications, to thereby enable others skilled in the art to utilize the disclosure and various embodiments with various modifications as are suited to the particular use contemplated. Many other examples will be apparent to one skilled in the art upon reviewing the above specification.

The invention claimed is:

1. A steering control device with an indicator light system for a motor vehicle, comprising:
 a plurality of light emitting elements, wherein the light emitting elements comprise LEDs, distributed over an indication surface of the steering control device; and
 a control unit configured to collectively control the light emitting elements to display an illumination pattern depending on at least one of a driving situation and a system condition;
 wherein the control unit is configured to control an intensity of the illumination pattern based on position data comprising at least one of driver position data and steering control device position data; and
 wherein the driver position data includes at least one of an estimated driver eye position and a measured driver eye position.

2. The steering control device according to claim 1, wherein the control unit is configured to at least one of selectively adjust brightness and/or color of the light emitting elements and selectively activate the light emitting elements.

3. The steering control device according to claim 1, wherein the control unit is configured to adapt the illumination pattern based on at least one of a current orientation and a current position of the steering control device on a steering angle of the steering control device.

4. The steering control device according to claim 1, wherein the light emitting elements are arranged on the indication surface as at least one of an array, a band and a planar shape, wherein the indication surface is positioned peripherally on a front side of the steering control device.

5. The steering control device according to claim 1, wherein the steering control device is a steering wheel.

6. The steering control device according to claim 5, wherein the plurality of light emitting elements are arranged as a ring around a circumference of the steering wheel.

7. A motor vehicle with a steering control device having an indicator lighting system according to claim 1.

8. The motor vehicle according to claim 7, wherein the control unit is configured to adapt the illumination pattern depending on a movement of the steering control device relative to an interior of the motor vehicle, such that the illumination pattern is stationary relative to the interior.

9. A method for operating a peripheral indicator lighting system of a steering control device according to claim 1, comprising:
 collectively controlling, by the control device, the light emitting elements to display an illumination pattern depending on at least one of a driving situation and a system condition.

10. The method according to claim 9, further comprising:
 acquiring position data, by a sensor device, comprising a least one of driver position data and steering control device position data; and
 controlling, by the control device, an intensity of the illumination pattern based on the acquired position data.

11. The method according to claim 9, wherein controlling the light emitting elements and/or controlling the intensity of the illumination pattern comprises at least one of selectively adjusting brightness and/or color of the light emitting elements and selectively activating the light emitting elements.

12. The method according to claim 9, further comprising:
 adapting, by the control device, the illumination pattern based on at least one of a current orientation and a current position of the steering control device.

13. The method according to claim 12, wherein the illumination pattern is adapted depending on a movement of the steering control device relative to an interior of the motor vehicle such that the illumination pattern is stationary relative to the interior.

* * * * *